Nov. 22, 1960   C. VAN DER LELY ET AL   2,960,815
CASTOR WHEEL SUPPORT ARRANGEMENT FOR AGRICULTURAL IMPLEMENT
Filed Nov. 22, 1955   3 Sheets-Sheet 1

United States Patent Office 2,960,815
Patented Nov. 22, 1960

2,960,815

CASTOR WHEEL SUPPORT ARRANGEMENT FOR AGRICULTURAL IMPLEMENT

Cornelis van der Lely and Ary van der Lely, Maasland, Netherlands, assignors to C. van der Lely N.V., Maasland, Netherlands, a Dutch limited-liability company Filed Nov. 22, 1955, Ser. No. 548,493

Claims priority, application Netherlands Nov. 23, 1954

5 Claims. (Cl. 56—377)

The invention relates to mobile devices having frames provided with supporting members exerting a pressure on the ground traversed, the position of these members affecting the behavior of the device while moving and the supporting members tending to occupy certain preferred positions with regard to the frame. Devices of this kind are known and generally include wheels continually controlled by a driver.

It is an object of the present invention to provide an improved device in which the supporting member has a certain preferred position, but in which a control by the driver is not necessary.

According to the invention, a supporting member leaves the preferred position in normal operation only when influenced by a force transverse to the normal travelling direction, said force being exerted by the resistance of the ground to movement of the member. Further, at least one resilient element is provided which during deviation tends to put the supporting member into the preferred position.

Embodiments and details of the invention will be hereinafter more fully described with reference to the accompanying drawings in which:

Fig. 1 shows a plan view of a first embodiment of the invention for laterally raking hay and the like;

Figure 1:
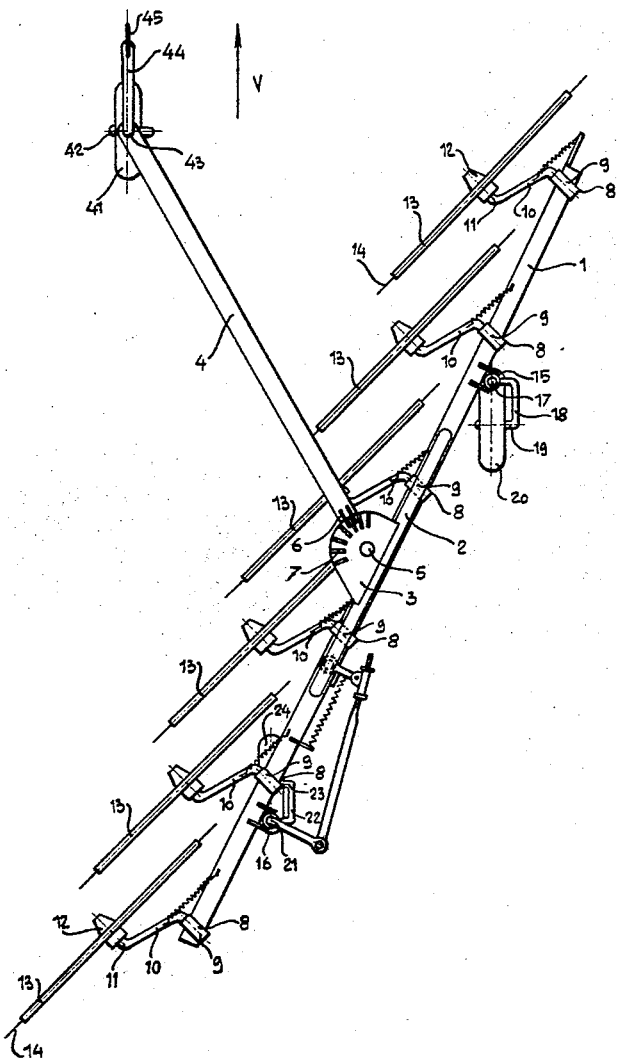
Figure 2:
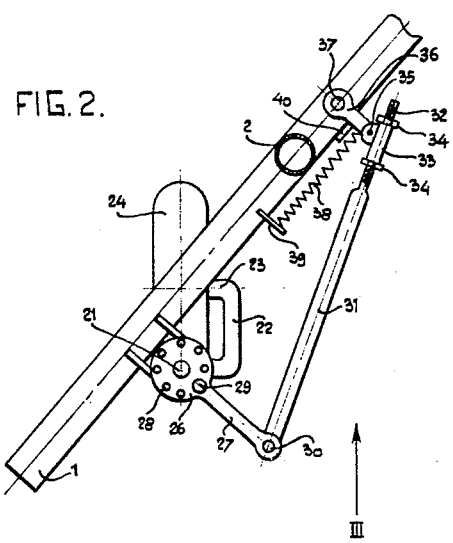
Fig. 2 represents a plan view of a detail of the device according to Fig. 1 but on a larger scale.
Figure 3:
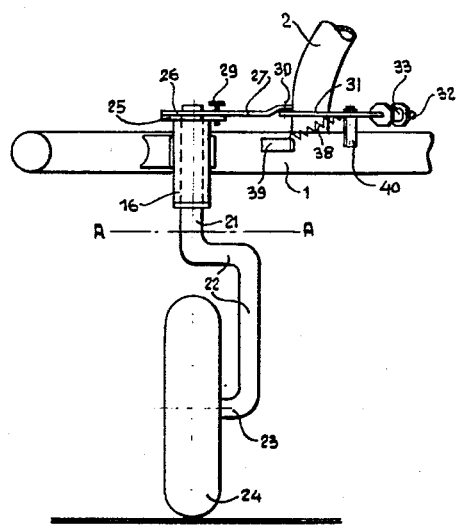
Fig. 3 shows a rear elevational view of the part of the device which is shown in Fig. 2.

In Fig. 1, a device according to the invention comprises a frame consisting substantially of a beam 1 on which a bow 2 is fixed. A disc 3 is welded to the upper end of said bow which is U-shaped, an arm 4 being hingedly connected to said disc 3. A hinge axle 5 is vertical, and the arm 4 can be secured in a large number of positions by means of a locking device 6 which is attached to the arm 4 and which can be dropped in any of slots 7 arranged in an edge of the disc 3. The beam 1 carries six bearings 8, the center lines 9 of which run parallel to one another. The axle of a crank 10 is journaled in each bearing 8. A rake wheel is rotatably mounted on crank pins 11 of cranks 10, said rake wheel being composed of a hub 12, a rim 13 attached to the hub 12, and a number of teeth 14 maintained in position by the rim 13. In any position of a crank 10, the associated crank pin 11 is parallel to the center line 9 of the axle of the crank 10, so that the planes of the rims 13 are all parallel to one another. Bushings 15 and 16 are fixedly attached in vertical position to the beam 1. An axle 17 is rotatably accommodated in the bushing 15, the lower end of said axle being connected to a horizontal axle 19 of a running wheel 20 by means of a bracket 18. The axles 17 and 19 traverse each other at a sufficiently great distance for causing the running wheel 20 to be self-adjusting. An axle 21 is rotatably journaled in the bushing 16, the lower end of said axle being fixed to the horizontal axle 23 of a running wheel 24 by means of a bracket 22 (see also Figs. 2 and 3). The axle 23 traverses the axle 21 at a substantial distance, but the running wheel 24 is not a self-adjusting running wheel as a consequence of the remaining construction.

Near the upper end of the axle 21 above the bushing 16, a disc 25 (Fig. 3) is attached to the axle 21, in which disc a number of holes are provided. A second disc 26 rotatable about the axle 21 and bearing an arm 27 is provided with holes 28. The holes 28 and the holes in the disc 25 are arranged in such a way that the discs 25 and 26 can be secured in a large number of relative positions by means of a pin 29 which can be passed through aligned holes in the discs 25 and 26. A vertical hinge pin 30 connects the free end of the arm 27 to a bar 31, the end 32 of which is threaded.

A bushing 33 on the end 32 is locked between nuts 34 on the threaded end 32. The distance of the bushing 33 to the pin 30 can be adjusted by moving the nuts 34. The bushing 33 is hingedly connected to an arm 36 by means of a vertical hinge pin 35, said arm 36 being rotatable about a vertical pin 37 mounted on the beam 1. The arm 36 is connected to a lug 39 on the beam 1 by means of a drawspring 38, so that the spring tends to impart to the arm 36, the arm 27 and the wheel 24 a clockwise rotation as seen from above. A stop member 40, however, is attached to the beam 1, the arm 36 striking against said stop member 40.

With the beam 1 supported by the running wheels 20 and 24, the front end of the arm 4 rests upon a running wheel 41 constituting the third supporting point for the frame. A horizontal axle 42 for the running wheel 41 is connected to a vertical axle 43 intersecting said axle 42 and rotatably mounted at the front end of the arm 4 and carrying a bracket 44 to which a hook 45 for drawing the device is attached.

If the device described is pulled along the ground in the direction V (Fig. 1), the wheel 24 will, as long as no trouble occurs, be found in the extreme clockwise position permitted by the stop member 40. The position in which the arm 36 rests against the stop member 40 defines the preferred position of the running wheel 24 with regard to the frame. While travelling, the rake wheels 13 will deliver the hay or other material in known manner to the left, a force being exerted over the rake wheels to the right and backwards. Said force varies within very wide limits. The fact is that the force is dependent on the crop which is treated, on the travelling velocity, on the angle between the rake wheels and the travelling direction, and on the slope of the terrain traversed. The sideward component of said force tends first of all to displace the wheels 41, 20 and 24 laterally along the ground. The wheels 41 and 24 resist this as long as they do not slip as is the case in normal operation at flat terrain. If the pressure increases too much by the fact of the rake wheels coming into contact with an irregularity or the like, the horizontal reaction force of the ground to the wheel 24 can increase to such an extent before slipping occurs that the moment of said force around the axle 21 causes the wheel 24 to rotate counterclockwise around the axle 21 against the action of the spring 38. Usually, the pressure on the rake wheels will still further increase and slipping will occur. In that case, the wheel 24 occupies, however, a tilted position which, as soon as slipping ceases, puts the frame back in its former relative position. In these cases, a situation may occur in which the sideward component of the force is only received in the case of the wheel 24 having a counter-steering position. During operation the wheel 24 thus always makes a fairly large angle with the travelling direction.

In known devices such a position of the wheel 24 could only be obtained by fixing the running wheel in a certain position. The result is, however, that, as soon as the sideward force diminishes, the device takes an undesired position.

In the device according to the invention, however, the adjustment is automatic. A greater sideward force immediately causes a turn of the wheel 24 about the axle 21, due to which the device is put back immediately into its original position. If need be (e.g., in order to obtain another position of the rake wheels 13 relative to the direction of travel or when the arm 4 changes its position) it will be possible to give the running wheel 24 a different preferred position by adjusting the nuts 34 and/or the pin 29.

Figure 4:
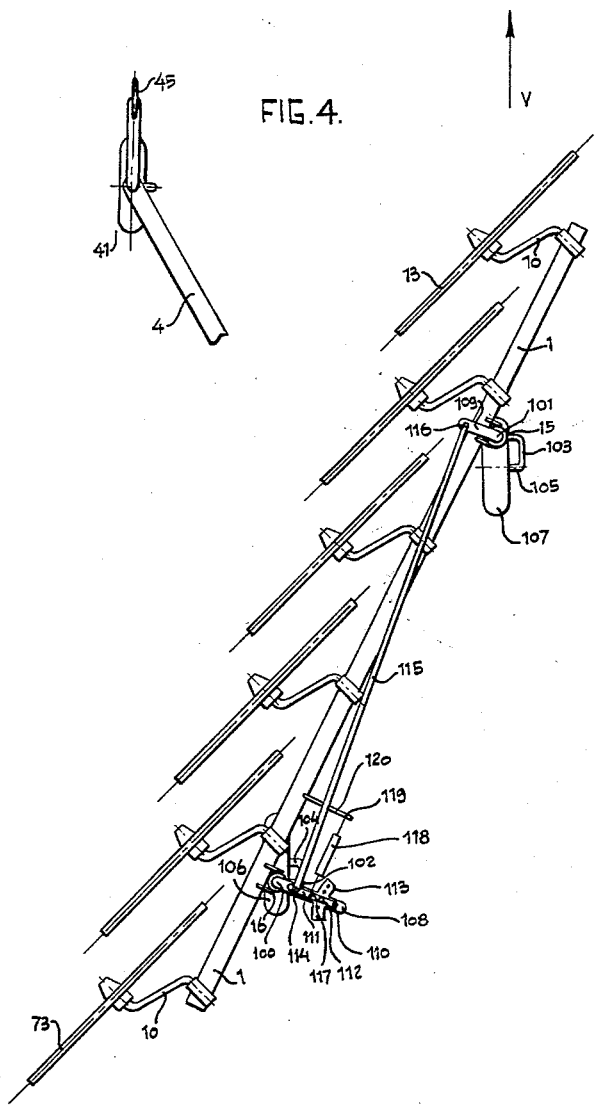
Fig. 4 is a plan elevation of still another embodiment of the invention, said device being adapted for use for the same purposes as the device according to Fig. 1.

The device according to Fig. 4 differs from that according to Fig. 1 only so far as the supporting of the beam 1 by means of the running wheels is concerned. The same parts in both constructions are designated with the same reference numerals, the fastening of the arm 4 to the beam 1 being effected in the construction of Fig. 4 in exactly the same way as in Fig. 1 and is omitted for the sake of clarity. According to Fig. 4, in bushings 16 and 15, respectively, axles 100 and 101 are supported and connected to horizontal axles 104 and 105, respectively, of running wheels 106 and 107 by means of brackets 102 and 103, respectively. Arms 108 and 109, respectively, are fixed to axles 100 and 101. A secondary arm 111 is mounted rotatably about a vertical hinge pin 110 on the arm 108. Said secondary arm 111 can be secured by means of a pin 112 in a plurality of positions which correspond to the holes in a sector 113 forming an integral part of the arm 108. The free extremity of the secondary arm 111 is hingedly attached by means of a pin 114 to the extremity of a bar 115, the other extremity of which is hingedly connected by means of a pin 116 to the free extremity of the arm 109. Finally, a point 117 of the arm 111 is hingedly connected to the extremity of a resilient element 118, the other extremity of which is hingedly connected to a point 119 of an arm 120 fixedly attached to the beam 1.

It is observed that if, in the device according to Fig. 4, the running wheels 106 and 107 are rigidly attached, substantially equal sideward forces work on them during the raking action while driving straight forward. The distance between the axle 101 and the axle 105 is one and a half times the distance between the axle 100 and the axle 104, so that the wheel 107 exerts a force on the axle 101 which is one and a half times the force exerted by the wheel 106 on the axle 100. However, the axles 100 and 101 are coupled by means of the arms 108 and 109 and the bar 115. The distance from the pin 116 to the axle 101 is one and a half times the distance from the pin 114 to the axle 100, so that the forces on the axles 100 and 101 are equally balanced. If no disturbance occurs, the running wheels 106 and 107 remain in parallel planes and the resilient element 118 exerts no force. Differing distributions of the sideward pressure on the wheels 106 and 107 are received by the device 118 without deviation, unless the distribution becomes very unequal.

In known devices, sideward pressure could not be met by both running wheels supporting the beam 1, for if both running wheels are secured against displacement, turns can only be made during the slipping of one or both running wheels. For that reason, one of the running wheels has to be self-adjusting and in that case it can not oppose a sideward pressure. If the device according to Fig. 4 makes a turn, such a large sideward force will work on the wheel 107 that the length of the element 118 will change. Said change continues till the wheels 106 and 107 have reached the position required for turning without skidding.

As in the device of Fig. 1, the position of the rake wheels 13 in Fig. 4 can be modified with regard to the travelling direction V. To this end, the secondary arm 111 is adjusted to another position relative to the arm 108. The running wheel 106 as well as the running wheel 107 will occupy another preferred position by means of said adjustment effected by means of a suitable proportion of the displacement of the pin 114 and the point 117 so that the wheels comprise again parallel planes in the new preferred positions of the wheels.

It is apparent that the wheels 106 and 107 can also be adjustable with regard to the axles 100 and 101. This is important when the arm 4 is put into an entirely different position and the device is used as a teddering device.

What is claimed is:

1. An agricultural implement comprising a frame having a determinable direction of travel, a first supporting wheel on the frame and pivotal about a vertical axis, said first supporting wheel having an axis of rotation positioned behind said vertical axis, a second supporting wheel on and supporting the frame for ground traversing movement, means on the frame adapting the latter for propulsion, means on the frame engaging the ground traversed, the latter said means subjecting the frame to lateral forces, said second wheel being a castor wheel defining an axis of rotation and including a substantially vertical castor axle coupled to the frame, and control means coupled to the castor wheel to position the axis of rotation thereof in front of the castor axle, said control means including a resilient device coupled to the castor axle for resisting rotation thereof.

2. An implement as claimed in claim 1 comprising adjustment means coupled to the control means to determine a normal position for said castor wheel.

3. An implement as claimed in claim 1 wherein the control means comprises an arm on the castor axle and rotatable therewith, an arm pivoted on the frame, and a link connecting the arms, said resilient device being connected between the frame and the arm on the frame for urging the latter said arm in one predetermined rotational direction.

4. An implement as claimed in claim 3 wherein the link comprises separate sections threadably engaged and coupled to respective ones of said arms to adjust the relationship between the arms.

5. An implement as claimed in claim 3 comprising a stop on the frame to intercept one of said arms and limit the movement thereof.

References Cited in the file of this patent
UNITED STATES PATENTS

| | | |
|---|---|---|
| 95,383 | Russell | Sept. 28, 1869 |
| 451,527 | Sattley | May 5, 1891 |
| 852,896 | Nelson | May 7, 1907 |
| 2,057,655 | Anthony | Oct. 20, 1936 |
| 2,577,416 | Geisse | Dec. 4, 1951 |
| 2,761,692 | Sisulak | Sept. 4, 1956 |